Dec. 17, 1968   J. J. FANNON, JR., ETAL   3,416,511
COMBUSTION TYPE INFRARED GENERATORS
Filed Jan. 20, 1967                     5 Sheets-Sheet 4
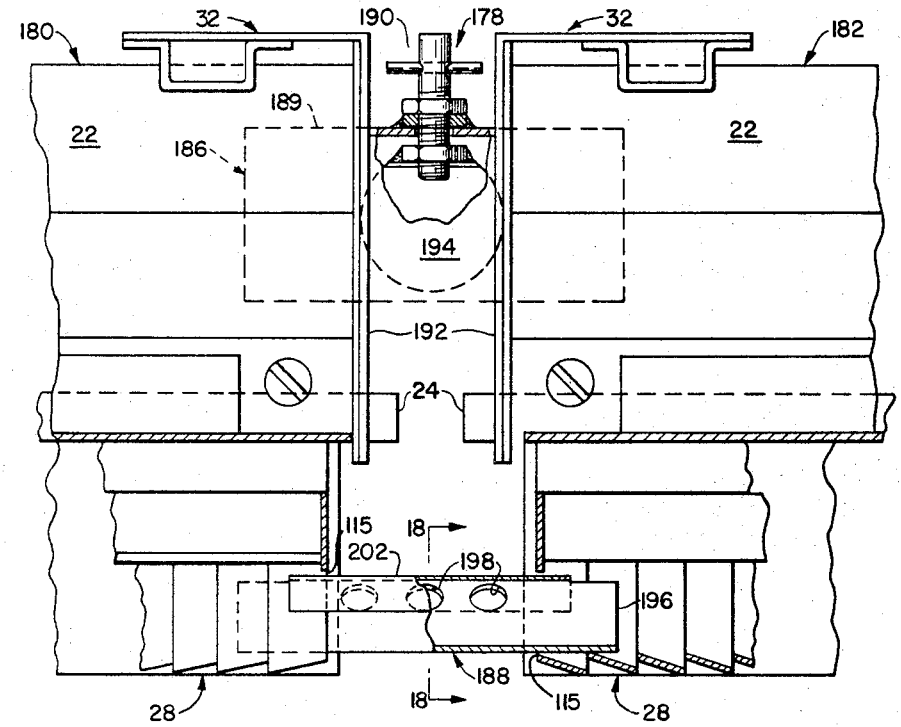
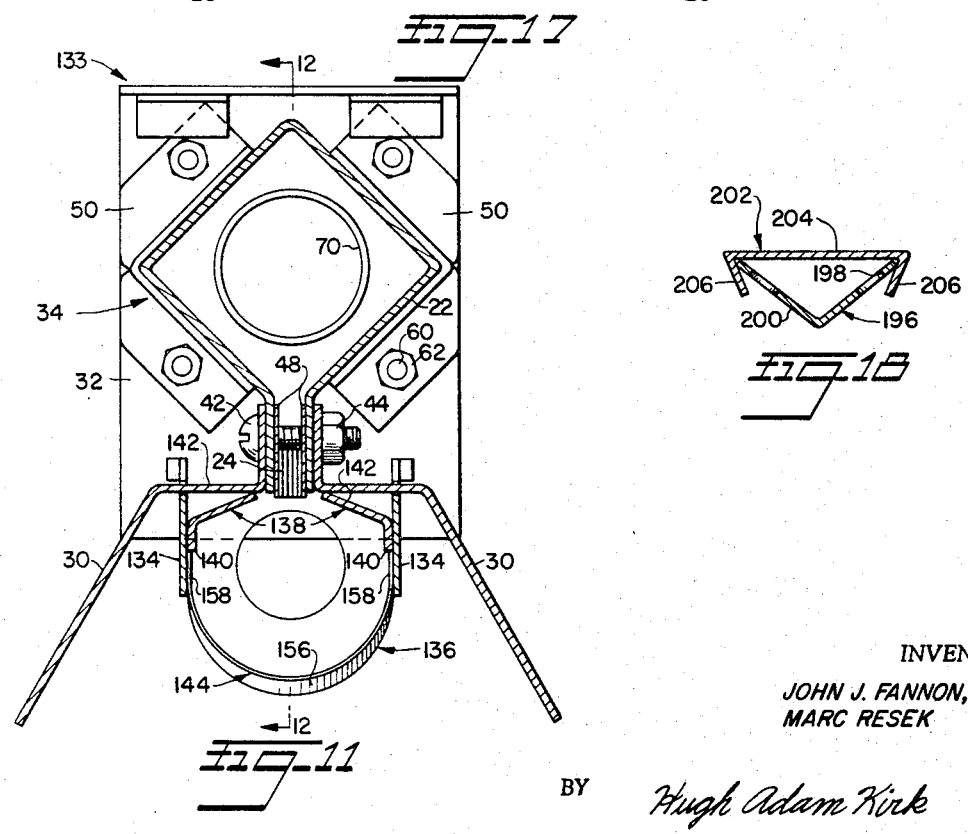
INVENTOR
JOHN J. FANNON, JR.
MARC RESEK
BY  *Hugh Adam Kirk*
ATTORNEY

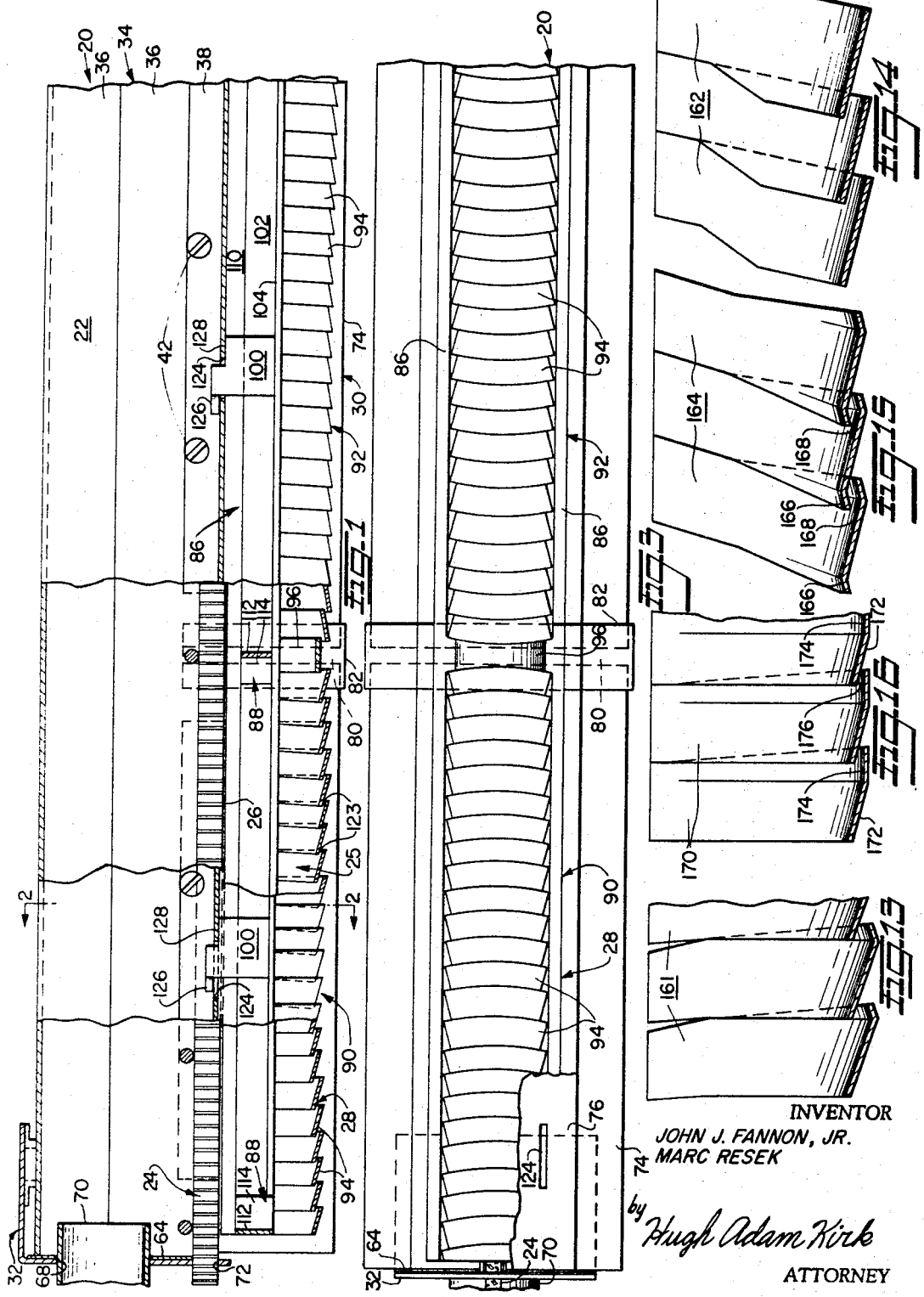

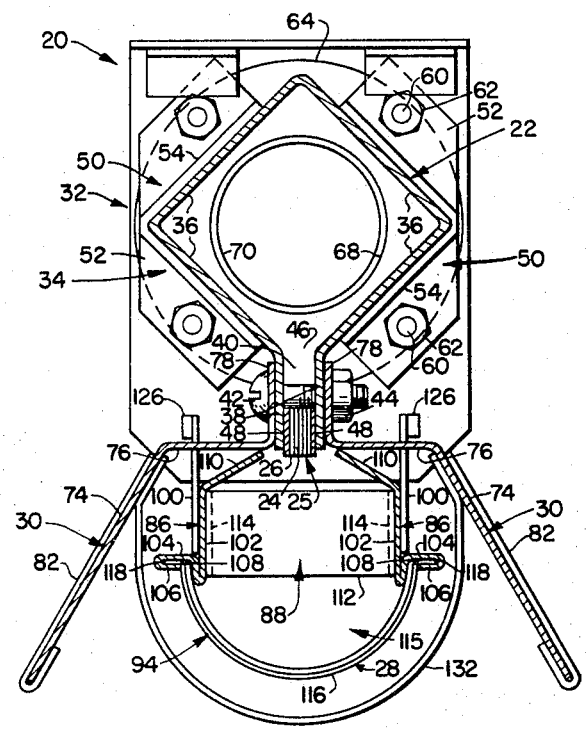
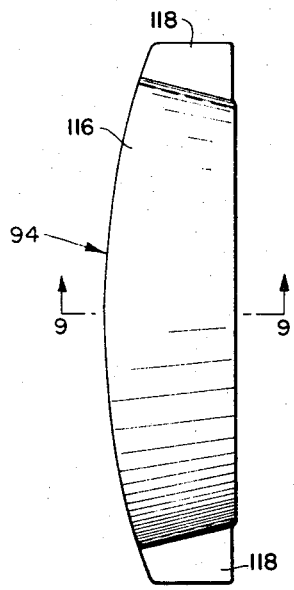
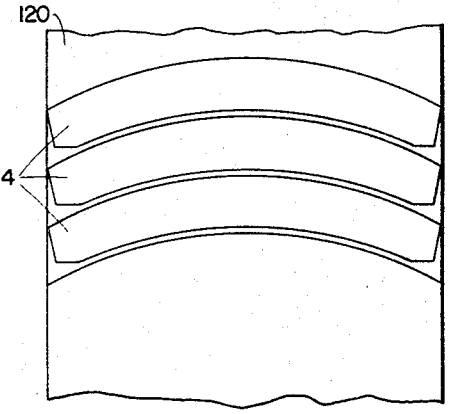
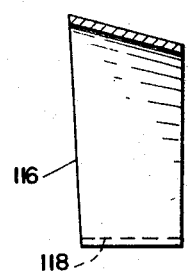
INVENTOR
JOHN J. FANNON, JR.
MARC RESEK
BY  *Hugh Adam Kirk*
ATTORNEY

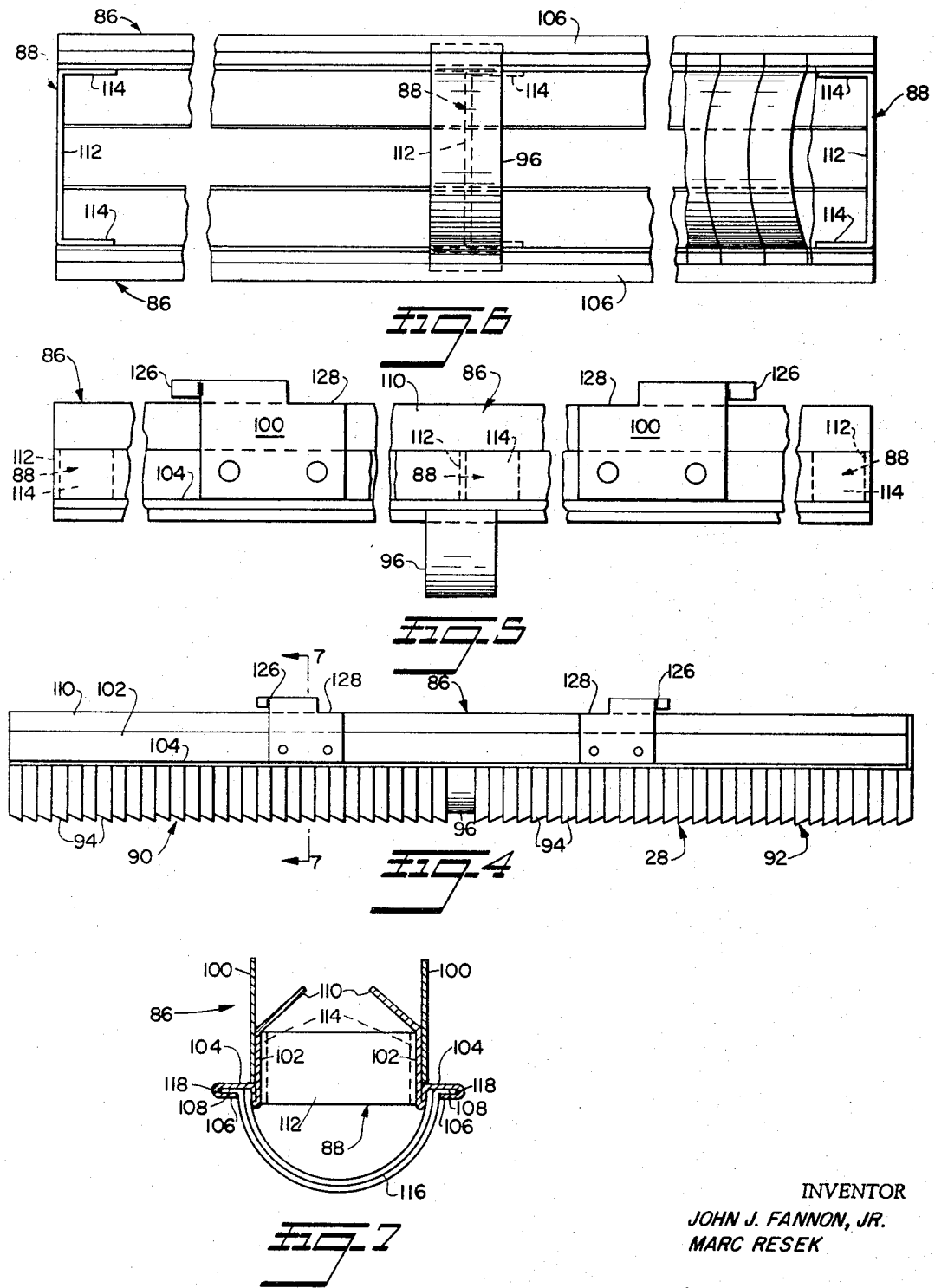

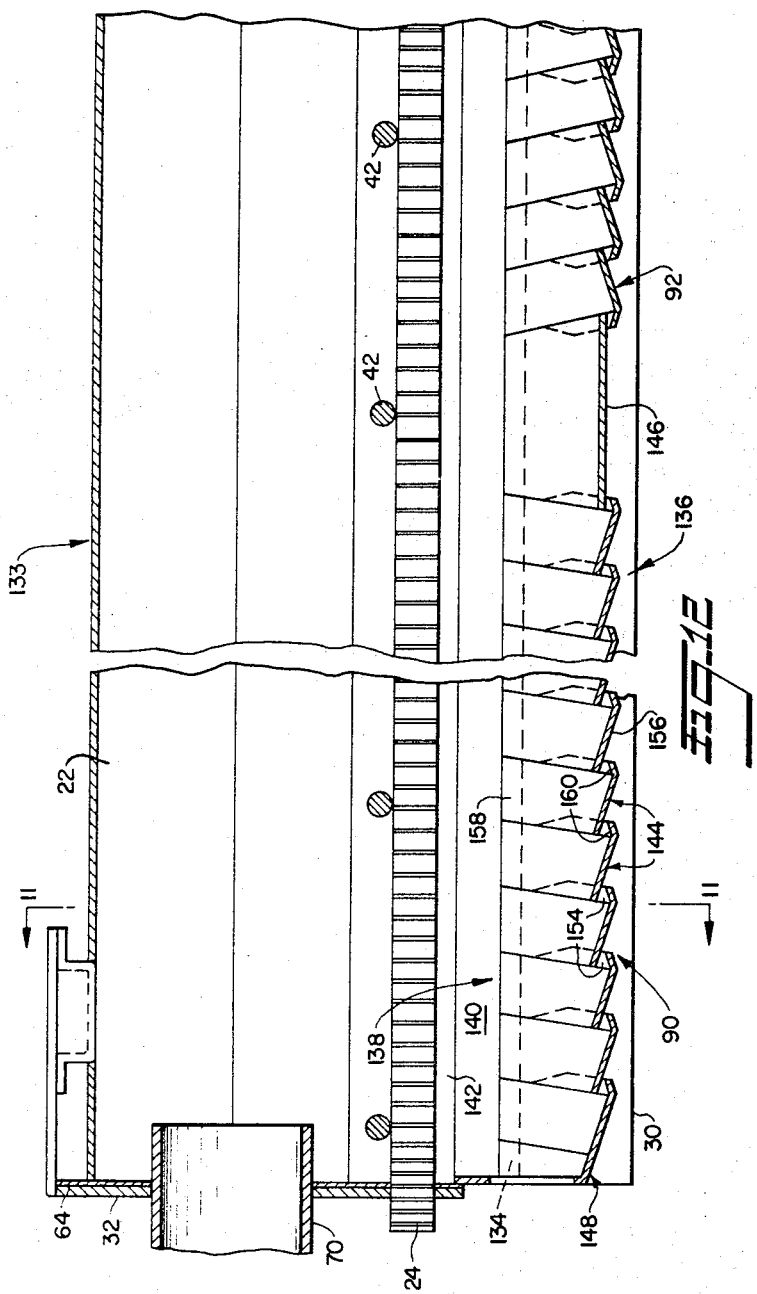

United States Patent Office 3,416,511
Patented Dec. 17, 1968

3,416,511
COMBUSTION TYPE INFRARED GENERATORS
John J. Fannon, Jr., Grosse Pointe Park, Mich., and Marc Resek, Shaker Heights, Ohio, assignors to Fostoria-Fannon, Incorporated, Fostoria, Ohio, a corporation of Ohio
Filed Jan. 20, 1967, Ser. No. 610,515
35 Claims. (Cl. 126—92)

ABSTRACT OF THE DISCLOSURE

An infrared burner or generator having an elongated distribution tube which is provided with an orifice structure along its longitudinal length. An elongated radiating member, formed of a series of overlapping arch-like blades with a discharge opening between each blade, surrounds the orifice structure and forms a combustion chamber. These arch-like blades are so configured that combustion products exiting through the discharge openings wipe both sides of each blade. When an installation includes two infrared generators aligned in an end-to-end relationship, a conduit having a valve therein may be provided between the opposed ends of the distribution tubes, and a flash tube may be provided between the ends of the radiating members. The installation may also be provided with reflectors and heat shields for the radiating member.

---

In one heretofore known type of infrared generator, a combustible fuel-air mixture flows from a plenum or distribution chamber through a series of ports or apertures to a combustion zone surrounded by a radiating member or radiant. As the fuel-air mixture burns within the combustion chamber, it heats the radiant to incandescence, causing it to emit radiant energy primarily in the infrared portion of the spectrum. Typical infrared generators of this type are those described in U.S. Patents Nos. 935,886 to Bloomberg, 1,272,306 to Parisen, and 2,980,104 to Patrick. Improved infrared generators of this type are disclosed in application No. 397,775 filed Sept. 21, 1964, now Patent No. 3,339,539 issued Sept. 5, 1967.

One of the disadvantages of infrared generators of the type just mentioned is that they have relatively low efficiencies. This is at least in part because combustion products only contact one side of the radiant so that there is comparatively poor convective transfer of heat from the combustion products to the radiants. Also, the radiants employed in the above-mentioned infrared generators have exhaust apertures for the combustion products which aggregate 20–40% of the total surface area of the radiant. These holes reduce substantially both the heat absorbing capacity of a radiant grid of given size and the radiant energy emitted from it. The presence of these holes therefore results in a material reduction in the percentage of combustion heat converted to infrared radiation.

Another disadvantage of infrared generators of the type mentioned above is that the radiating members or radiants have a comparatively short service life. In addition, they are oftentimes expensive to manufacture because they are difficult to assemble. For the same reason field replacement of these components can pose problems.

In a second type of previously known infrared generator, the combustible fuel-air mixture flows from the plenum chamber through apertures or ports in a ceramic primary radiant and burns on the surface of the radiant, heating it to incandescence. A reradiator, which may consist of a series of overlapped slats or blades, is commonly mounted adjacent the surface of the radiant on which combustion occurs. The primary functions of the reradiator are to confine the flame to the surface of the primary radiant and to reflect heat onto the primary radiant to increase the temperature of the latter. To enable them to withstand the temperatures to which they are heated without warping or buckling, the reradiators are also fabricated of ceramic material. Typical infrared generators of this type are those described in U.S. Patents Nos. 1,139,321 to Allen and 3,044,538 to Honger.

One important disadvantage of the type of infrared generator described in the preceding paragraph is that the ceramic components are quite fragile. Such infrared generators are also highly susceptible to backfiring, which can cause extensive damage. Further, this type of infrared generator is commonly susceptible to air currents because air currents can readily pass through the radiating structure to the combustion zone. This characteristic makes such burners unsuitable for use in drafty locations or out-of-doors.

A third type of heretofore known infrared generator is similar to the type just described except that the primary radiant is composed of a fine screen or a plurality of superimposed screens, and it does not employ a reradiator. A typical infrared generator of this type is disclosed in British patent specification No. 524,062.

While this screen type infrared generator does not have fragile ceramic components like those described previously, the flame in such a burner is unstable and is highly susceptible to air currents, blowing out in even a mild wind. Moreover, this type of infrared generators is notoriously inefficient because the holes in the screen constitute a high percentage of the surface area of the radiant. Further, the radiants of such burners have only a short service life even when made of an expensive material such as Nichrome. Also, combustion is imperfect, and the temperature of the radiant surface is low and nonuniform, which can be particularly disadvantageous in industrial applications.

From the foregoing it will be apparent that previously known combustion type infrared generators have a number of serious disadvantages. It is one primary and important object of the present invention to provide novel, improved combustion type infrared generators which do not have these faults.

The infrared generators of the present invention, by which the foregoing and other important objects are attained, include a distribution member (typically an elongated tube) and an orifice structure through which a combustible mixture flows from the distribution member to a combustion zone adjacent the orifice structure. Surrounding the combustion zone is a primary radiating member or radiant which converts the heat of combustion liberated in the combustion zone and transferred to it by radiation and convection to radiant energy.

In the present invention the radiant is formed of a series of overlapping archlike blades or elements with discharge openings for the combustion products therebetween. The blades are so configured that combustion products exiting through the discharge openings also wipe both sides of each blade, maximizing the transfer of heat from the combustion products to the radiant.

Further gains in efficiency result from the overlapping arrangement of the radiant arches, which increases the area capable of absorbing heat from the combustion products and converting it to infrared radiation as well as the percentage of the surface capable of radiating energy. In this conjunction the radiant disclosed in copending application No. 397,775, now Patent No. 3,339,539 issued Sept. 5, 1967, has an apparently continuous radiating surface only when viewed from points at right angles to the radiating surface. The novel radiants disclosed herein are significantly superior to these just mentioned since they present a substantially uninterrupted radiating surface regardless of the angle from which the radiant is viewed.

Other important advantages of the noval radiant construction just described are that each of the radiating members is free to expand and contract independently of the others and that temperature differentials among the various components of the radiant are minimized. As a result, there is minimum stress on and distortion of the radiant components due to differential expansion and contraction.

Also, all components of the novel infrared generators disclosed herein except the radiant operate at relatively low temperatures and are therefore not susceptible to temperature induced deterioration.

The foregoing factors, together with the rugged construction of the present invention and the elimination of all fragile ceramics, result in a substantial increase in service life and make the present invention capable of being satisfactorily used in industrial applications in which ruggedness is often a prime requisite.

A further important feature of the novel infrared generators disclosed herein is that they are extremely simple, which facilitates fabrication, assembly, and servicing. Also, they employ no expensive ceramics and no costly heat resistant metal except in the radiant. Therefore the infrared generators disclosed herein are relatively inexpensive to manufacture and service.

Yet another important advantage of the novel infrared generators disclosed herein is their versatility. Unlike most, if not all of the previously known types of infrared generators described above, they can be operated over a wide temperature range by merely adjusting the flow rate of the combustible mixture. Also, because of the large total area of exhaust passages for combustion products and the continuous target for the flame provided by the novel radiant disclosed herein, there is no tendency for the flame to blow away or for carbon monoxide or oxides of nitrogen to form as the type of fuel is varied. Accordingly, unlike many previously known infrared generators, those provided by the present invention can be operated on a wide variety of fuels.

Still another important advantage of the novel infrared generators disclosed herein is that the radiant and adjacent generator components prevent the flame from being distributed or extinguished by winds and other high velocity air currents. Accordingly, the infrared generators disclosed herein are well-suited for use out-of-doors or in industrial ovens or other settings where high velocity air currents prevail.

Yet another advantage of this invention is that it includes a novel arrangement for distributing the combustible mixture among and propagating flame along the infrared generators of a multiple unit bank or other installation. This materially enhances the suitability and usefulness of the novel infrared generators disclosed herein for industrial ovens and similar applications.

A still further important advantage of the present invention is that the novel infrared generators disclosed herein can be operated in any desired orientation and/or grouping. For example, they can be operated with their radiants facing up, down, or sideways or even facing the radiants of an oppositely disposed bank of infrared generators.

Yet another advantage of the novel infrared generators disclosed herein is that they can be readily incorporated into space heaters and a wide variety of other types of heating devices and appliances.

From the foregoing it will be apparent that further but more specific objects of the present invention include the provision of novel, improved, combustion type, infrared generators which, in comparison to those heretofore known:

(1) have higher efficiencies;
(2) have a longer service life;
(3) employ fewer components of expensive materials, are simpler, and cost less to fabricate, assemble, and service, making them significantly less expensive to manufacture and maintain;
(4) are less susceptible to differential expansion and contraction-induced stresses and distortion and otherwise extremely rugged, making them more siutable for industrial and other applications where fragility is a decided detriment;
(5) are virtually completely insensitive to winds and other high velocity air currents, suiting them for use out-of-doors or in industrial ovens or other applications where high velocity air currents prevail;
(6) are capable of operating over a wider temperature range and on a greater variety of fuels;
(7) are capable of providing a higher intensity pattern of radiant energy when assembled in side-by-side and/or end-to-end relationship in multiple infrared generator units;
(8) can be operated in a wider variety of orientations; and
(9) can be readily incorporated in a wider variety of infrared type heating devices and appliances.

Another important object of the present invention resides in the provision of novel, improved radiant grids capable of producing the advantages described above.

A still further object of this invention is the provision of a novel improved arrangement for distributing a combustible mixture among and propagating the flame along the infrared generators in a multiple burner bank or installation.

Other important objects and further novel features, as well as additional advantages, of the present invention will become apparent from the appended claims and as the ensuing detailed discussion and description proceeds in conjunction with the accompanying drawing, in which:

FIGURE 1 is a partial side view of an infrared generator constructed in accord with and embodying the principles of the present invention;

FIGURE 2 is a section through the infrared generator of FIGURE 1, taken substantially along line 2—2 of the latter figure;

FIGURE 3 is a partial bottom view of the infrared generator of FIGURE 1;

FIGURE 4 is a side view of a novel, improved radiant including a plurality of independent, archlike radiating blades or elements in accord with the principles of the present invention;

FIGURE 5 is a side view of the radiant of FIGURE 4 with the majority of the independent radiating elements removed to better show the remaining components of the radiant;

FIGURE 6 is a bottom view of the structure of FIGURE 5;

FIGURE 7 is a section through the radiant of FIGURE 4, taken substantially along line 7—7 of the latter figure;

FIGURE 8 is a plan view of one of the archlike radiating elements;

FIGURE 9 is a section through the radiating element of FIGURE 8, taken substantially along line 9—9 of the latter figure and rotated 90° in a clockwise direction;

FIGURE 10 illustrates how the radiating elements are laid out on the sheet material from which they are fabricated;

FIGURE 11 is a section through a second form of infrared generators constructed in accord with the principles of the present invention, taken substantially along line 11—11 of FIGURE 12;

FIGURE 12 is a section through the infrared generator of FIGURE 11, taken substantially along line 12—12 of the latter figure;

FIGURES 13–16 are sections through additional, exemplary forms of radiant elements which may be employed in radiants and infrared generators constructed in accord with the principles of the present invention;

FIGURE 17 is a partial side view, partly in section, of a multiple unit installation of infrared generators assembled in accord with the principles of the present invention; and FIGURE 18 is a section through a novel flame propagating or flash tube constructed in accord with the principles of the present invention, taken substantially along line 18—18 of FIGURE 17.

Referring now to the drawing, in which exemplary embodiments of the present invention are shown, FIGURE 1 depicts a longitudinal extending infrared generator 20 constructed in accordance with the principles of the present invention. Infrared generator 20 includes a longitudinal extending fuel-air mixture distribution tube 22; a longitudinal orifice structure or grid 24, through which the fuel-air mixture flows from the interior of distribution tube 22 to a longitudinal combustion zone 25 adjacent the outer end or face 26 of the grid; one or more longitudinal extending radiant grids or radiants 28, heated to incandescence by the combustion of the fuel-air mixture; longitudinal extending reflectors 30 for concentrating the radiant energy emitted by radiants 28 and projecting it in the desired direction or directions; and end plates 32 (only one of which is shown) which form closures for the open ends of the distribution tube. Distribution tube 22, together with orifice grid 24 and end plates 32 constitute a line burner identified generally by reference character 34.

Referring now to FIGURES 1 and 2, distribution tube 22 is formed from sheet metal (aluminized sheet steel is satisfactory) into a generally diamondlike configurationu defined by four side walls 36. As is best shown in FIGURE 2, the opposed lateral edge portions of the sheet from which distribution tube 22 is formed are bent at angles to the two distribution walls 36 with which they are integral to form two parallel, spaced apart flanges 38. Between these flanges is an outlet passage 40 from the interior to the exterior of the distribution tube. The preferred method of fabricating distribution tube 22 is described in copending application No. 395,839 filed Sept. 11, 1964, now Patent No. 3,351,048 issued Nov. 7, 1967.

Orifice grid 24, through which the combustible fuel-air mixture flows from distribution tube 22, is mounted in outlet passage 40 to effect a uniform distribution of the combustible mixture over combustion zone 25 and to prevent the flame from flashing back from the combustion zone through passage 40 to the interior of distribution tube 22. The illustrated orifice grid 24 is of the ribbon type (it is not critical that a ribbon type orifice be employed) and consists of embossed metallic ribbons which provide a number of small passages extending between and opening onto the opposed lateral edges of the assemblage of ribbons. The particular configuration of the individual ribbon is not critical in the present invention; and the length and total area of the lateral passages may be varied as desired for particular applications of this invention. It is necessary, however, that the lateral passages be sufficiently small in cross section and sufficiently long that flame cannot flash back through the passages from the combustion zone adjacent the outer face 26 of the orifice structure to the interior of distribution tube 22. In addition, the total area of the openings must be great enough that the combustible mixture will flow from distribution tube 22 to the combustion zone in sufficient quantity to maintain the desired rate of combustion. As suitable orifice structures are disclosed in copending application No. 395,839, now Patent No. 3,351,048 issued Nov. 7, 1967, and as the construction of the orifice grid, by itself, is not part of the present invention it is not believed necessary to describe it further herein.

Orifice grid 24 is removably retained in outlet passage 40 by bolts 42 and nuts 44 (see FIGURE 1). Bolts 42 extend laterally through distribution tube flanges 38 at spaced intervals along the distribution tube and locate orifice grid 24 relative to the inner end 46 of passage 40. Nuts 44, which are threaded on the ends of bolts 42, clamp flanges 38 against orifice structure 24 to removably retain it in passage 40.

As shown in FIGURE 2, strips 48 of heat resistant material are interposed between the outermost ribbons of orifice grid 24 and distribution tube flanges 38 to stiffen the latter and to protect them from the heat generated in combustion zone 25. This helps to prevent warpage of the flanges and, therefore, materially increases the service life of the type of infrared generator disclosed therein. Bolts 42 pass through holes (not shown) in strips 48.

Referring now to FIGURES 1-3, sheet metal end plates 32, which close the open ends of distribution tube 22 and are of the L-shaped configuration described in detail in copending application No. 397,775, now Patent No. 3,339,539 issued Sept. 5, 1967, are attached to tube 22 by angle clamps 50, which are best illustrated in FIGURE 2. The angle clamps are fixed in pairs to each end of fuel-air mixture distribution tube 22. Each of the angle clamps includes a clamping leg 52 and a base 54 bent, midway between its ends, to abut adjacent upper and lower distribution tube side walls 36.

Angle clamps 50 are fixed to distribution tube 22 by spot welding their bases 54 to distribution tube side walls 36. The two angle clamps 50 at each end of distribution tube 22 are aligned transversely of the tube so that their clamping legs 52 lie in the same plane.

End plates 32 are fixed to the clamping legs 52 of the angle clamps by bolts 60 and nuts 62, threaded on the bolts 60, which clamp the end plates against the angle clamps.

Referring now to FIGURE 1, to prevent the combustible mixture from leaking through the ends of fuel-air mixture distribution tube 22, gaskets 64 (only one of which is shown) are assembled between end plates 32 and the associated ends of distribution tube 22. When bolts 60 are tightened, the gaskets are compressed and form gas-tight seals between the ends of the distribution tube and the end plates.

An aperture 68 is formed in one end plate 32 to accommodate a combustible mixture supply conduit 70. The conduit extends from the source of the combustible mixture (which is not shown, but may be, for example, a fuel-air mixer) into the interior of the fuel-air mixture distribution tube.

Orifice grid 24 extends through rectangular holes 72 in end plates 32. Holes 72 are wider than grid 24 but only a few thousandths of an inch higher than the grid and are so located that they maintain the ends of the ribbons in proper position with respect to bolts 42. The grid may be moved longitudinally through these holes and removed for cleaning, for example, when nuts 44 are loosened.

Referring now to FIGURES 1 and 2, each of the two reflectors 30 of infrared generator 20 has a first reflecting leg 74, a second reflecting leg 76, and a mounting leg 78, by which the reflector is fixed to the fuel-air mixture distribution tube 22 of infrared generator 20.

As shown in FIGURES 1 and 3, reflectors 30 are assembled to distribution tube 22 in end-to-end relationship with gaps 80 between adjacent reflectors to accommodate expansion of the reflector during operation of infrared generator 20. Joint covers 82 of the type disclosed in copending application No. 401,135 filed Oct. 2, 1964, now Patent No. 3,336,915 issued Aug. 2, 1967, bridge these gaps and provide continuous reflecting surfaces.

Reflectors 30 are fixed to distribution tube 22 by the bolts 42, mentioned above, which extend through mounting legs 78, and by the retainers 44, which clamp mounting legs 78 against distribution tube flanges 38. This relationship of reflector mounting legs 78 to distribution tube flanges 38 is an important feature of the present invention since the reflector mounting legs protect the distribution tube flanges against the heat generated in combustion zone 25 and materially stiffen them, further increasing their resistance to warpage.

The components thus far described, with the exceptions discussed below, may be identical to those disclosed in more detail in the copending applications identified above and the following copending applications: 405,944 filed Oct. 23, 1966, now Patent No. 3,307,529 issued Mar. 7, 1967; 548,941 filed May 10, 1966, now Patent No. 3,369,536 issued Feb. 20, 1968; 558,435 filed June 17, 1966, and 563,612 filed July 7, 1966, now abandoned, to which reference may be had, if desired. All of the foregoing applications are assigned to the assignee of the present invention.

Referring now to FIGURES 4-7, each of the radiants 28 incorporated in infrared generator 20 (only one of which is shown) includes two parallel, spaced apart, integrated side rail and heat shields 86 connected by transversely extending ties 88, two groups 90 and 92 of inclined radiant elements or arches 94, a central radiant arch 96 at the longitudinal center of the radiant 28, and mounting tabs 100 for attaching the radiant to the desired supporting structure, which are fixed as by tack welding to components 86.

Side rail-heat shield components 86, which may be fabricated from any suitable heat resistant sheet metal, have side members 102 with integral wings 104 extending transversely therefrom. As shown in FIGURE 7, the wings are displaced from one edge of the associated side member 102. Wings 104 are formed by folding the sheet from which member 86 is fabricated against itself and then bending a part of the folded portion at right angles to itself. Edge portions 106 of wings 104 are doubled back in parallel, spaced relationship to the main portions of the wings to form slots 108 into which radiating elements 94 and 96 are adapted to be inserted, as will be described in more detail hereinafter.

The integral heat shield 110 of each component 86 is formed by bending one lateral edge portion of the sheet from which the component is fabricated at an angle to side member 102. The relationship between the side members and heat shields is best shown in FIGURE 7.

As indicated above, the two components 86 are connected together by ties 88. These ties join the side rails into a unitary structure and maintain them in parallel spaced apart relationship. They also partially enclose the open ends of the radiant. Ties 88 are generally U-shaped straps having a web 112 extending transversely between legs 102 and legs 114, which are fastened to the side walls 102 of components 86 as by tack welding.

One tie is employed at each end of radiant 28 and one in the center. The openings 115 between end ties 88 and the outermost arches 94 facilitate lighting of the burner incorporated in infrared generator 20.

Referring now specifically to FIGURES 8-10, radiating members or arches 94, which have a generally frustoconical configuration (as best shown in FIGURE 9), consist of a main body or radiating portion 116 and integral mounting wings or flanges 118. Members 94 may be easily formed by stamping them from a sheet 120 of heat resistant metal.

The configuration of radiating members 94 is an important practical feature from the manufacturing point-of-view since, as shown in FIGURE 10, they may be made with only minimal waste of material. Also important from the manufacturing point-of-view are the small gaps between adjacent members on blank 120. If members 94 are laid out so they are touching and stamped out, there will be distortion of the members. This is eliminated by the slight separation between them (about $\frac{1}{16}$ of an inch), which wastes only a negligible amount of material.

The center or central arch 96 between the two groups 90 and 92 of members 94 is similar to the latter members except that it has a semicylindrical rather than frusto-conical configuration so that its surface is parallel to the longitudinal axis of the two groups of radiant members or radiant 28.

Referring now to FIGURES 4-7, center arch 96 and inclined arches 94 are assembled to side rail components 86 by sliding their mounting flanges through slots 108 of the side rails. After the arches 94 and 96 have been slid into position, wing portions 104 and 106 of components 86 are pressed against the mounting flanges of the radiating members to lock them in place.

Referring now to FIGURES 1 and 2, with radiating members 94 and 96 assembled to side rail components 86 in the manner described above, there are exhaust passages 123 for the combustion products between adjacent radiating members 94 and between the innermost members 94 and center arch 96. With the two groups of arches 90 and 92 disposed in mirror image relationships as shown in FIGURE 6, exhaust passages 123 are inclined at an angle to side rail components 86; and the exit ends of the passages face the center of the radiant and are further from the side rails than the exhaust passage entrance.

There is also an overlap of adjacent members 94 and of the innermost members 94 and 96. This overlap and the frustoconical configuration of the radiant members as well as the orientation of the exhaust passages just described serve two important functions.

First, as shown by FIGURE 1, the combustion products exiting through passages 123 wipe over and heat the outer surfaces of members 94 and 96 as well as their inner surfaces because each arch 94 guides the combustion products flowing through the passage 123 thereadjacent into contact with the outer surface of the adjacent arch. Therefore, both surfaces of each arch are heated by the combustion products, maximizing the extraction of heat from these products.

The second important advantage of the construction just described is that one cannot "see through" radiant 28 except from substantially along a line corresponding to the axis of an exhaust passage 123. Accordingly, the open area observable from any given point is virtually negligible (one hole or passage). Therefore, radiant 28 has, in effect, a substantially continuous radiating surface. That is, as a practical matter, radiant 28 has a radiant surface equal in area to that of a solid sheet of metal of the same dimensions. This is extremely important both in maximizing the heat of combustion transferred to radiant 28 and in maximizing the emitting surface. Both factors of course contribute to the efficiency of infrared generator 20.

Another important advantage of the radiant construction described above is that the radiating members 94 and 96 are free to expand and contract independently of each other. Accordingly, there is minimum stress on and distortion of these components due to the differential expansion and contraction occurring as infrared generator 20 is cycled. Also, this construction is extremely rugged and has no ceramic or other elements. These factors combine to produce a radiant which has a substantially longer service life than other radiants heretofore available.

One further and important advantage of the novel radiant grid construction just described is that the arrangement of radiating members 94 and 96 prevents winds and other high velocity air currents from penetrating through them to combustion zone 25.

Referring now primarily to FIGURES 1 and 2, radiant grids 28 are assembled to the reflectors 30 of infrared generator 20 by inserting their mounting tabs 100 through elongated slots 124 in transversely extending reflector legs 76. After this is done, ears 126 on the tabs are bent laterally as shown in FIGURE 2. This locks the grid in place by confining the reflector legs between ears 126 and shoulders 128 on the mounting tabs. This arrangement prevents the grid from moving either toward or away from the reflector leg.

As shown in FIGURE 5, each grid 28 is provided with two sets of mounting tabs; and these are located approximately midway between the center of the grid and each end thereof. Also, as shown in FIGURE 1, the slots 124 are longer than the portions of the mounting tabs extending through them. This particular arrangement is of importance since it accommodates longitudinal expansion of the grids as the temperature of infrared generator 20 increases. When the infrared generator is cold, the tabs are adjacent the inner ends of slots 124. As the temperature of the infrared generator increases, either or both of the tabs can move toward the outer ends of the slots.

Referring still to FIGURE 1, and also to FIGURE 2, two radiant grids 28 (only one of which is shown) are employed in the illustrated exemplary infrared generator 20. This number may be decreased or increased depending upon the length of the infrared generator; but the grids are preferably confined to a maximum length of approximately 18 inches to minimize temperature-induced distortion of the grids. Where plural grids are employed, they are independently assembled to reflectors 30 with a gap (not shown) between adjacent grids to accommodate longitudinal expansion. To maintain continuity of the radiating surface, this gap is bridged by a radiating arch 132 of heat resistant material which is fastened to reflectors 30 by tack welding, for example.

Referring now specifically to FIGURE 2, the side members 102 and heat shields 110 of radiant grid 28 co-operate with the inclined and center arches 94 and 96 and the webs 112 of ties 88 to enclose combustion zone 25. Thus, the combustion process is protected against disturbance by high velocity air currents since legs 102 and 110 are impervious; and air currents cannot penetrate between adjacent elements 94 or radiating elements 94 and 96 as discussed above. This enclosing of the combustion zone also maximizes the absorption of energy radiated from the combustion products, contributing to the unusually high efficiency of the type of infrared generator disclosed herein.

As shown in FIGURE 2, heat shields 110 also protect reflectors 30 from the heat of combustion generated in the combustion zone since they are interposed between the combustion zone and the reflectors. This is important because the reflectors are typically fabricated from aluminized sheet steel or other metal which is not capable of withstanding the high temperatures generated in the combustion zone.

Many modifications of the exemplary structure described above will of course be obvious to those of ordinary skill in the arts to which the present invention pertains. Several such embodiments, which may be fabricated within the principles of the present invention, are illustrated in FIGURES 11-16.

Referring first to FIGURES 11 and 12, infrared generator 133 differs from that described above primarily in the configuration of the radiating members and in that the side rails and heat shields for the reflectors are separate components rather than integrally formed members as in the embodiment described above. The two infrared generators may otherwise be identical, and like reference characters have accordingly been employed to identify components which are the same in the two modifications.

In infrared generator 133, side rails 134 are elongated, platelike components extending substantially the length of radiant 136. Heat shields 138, which are separate members, have mounting legs 140 fixed as by tack welding to side rails 134. The shielding legs 142 of these components extend from the side rails to adjacent the passage defining flanges 38 of distribution tube 22 as in the embodiment of the invention described previously. And, as in infrared generator 20, side rails 134 and heat shields 138 co-operate with inclined radiating members 144, a center radiating member or arch 146, and end closures 148 of radiant 136 to enclose the combustion chamber and to provide a substantially uninterrupted radiating surface.

In the embodiment of the invention illustrated in FIGURES 11 and 12, inclined radiating members 144 have a generally semicylindrical or U-shaped configuration as opposed to the frustoconical configuration of the radiating members in the embodiment of the invention described previously. These radiating members are fixed to side rails 134 by tack welding in this embodiment of the invention and are disposed at a pronounced angle to the side rails rather than normally thereto as in the embodiment of FIGURES 1-10. The configuration and disposition of radiating members 144 just described provides exhaust passages 154 similar to those of the previously described embodiments.

To secure overlap of the radiating portions 156 of the radiating members, the legs 158 of these members are cut back to a narrower width as shown in FIGURE 12. This is necessary to insure that the legs do not overlap at the point of attachment to side rails 134.

Also, in this embodiment of the invention, an inwardly turned lip 160 is formed on the side of each radiating member main body portion 156 nearer the center or midpoint of the longitudinal extending radiant. Lips 160 direct the combustion products passing through exhaust passages 154 into intimate contact with the outer surfaces of the adjacent elements 144, insuring an efficient transfer of heat from the combustion products to the inclined radiating elements. Lips 160 also reduce the area of the openings which can be observed and therefore even further decrease the interruptions in the continuous radiant surface.

This embodiment of the invention also differs from that described previously in that center arch 146 is provided with a trapezoidal sectional configuration to insure overlap by the adjacent inclined radiating elements 144.

FIGURES 13-16 illustrate other forms of radiant arches which may be substituted for those described previously, if desired. The radiating elements 161 of FIGURE 13 are identical to those of FIGURE 12 except that they are so configured that they can be arranged at right angles to the side rails to which they are attached.

The radiant elements 162 illustrated in FIGURE 14 are, similarly, identical to those incorporated in infrared generator 133 except that inwardly turned lips 160 are omitted. Omission of these lips simplifies fabrication of the radiating elements; and, at the same time, results in only a minor decrease in efficiency.

The radiating elements or arches 164 of FIGURE 15 are also similar to those illustrated in FIGURE 12 except that outwardly directed flanges 166 are provided on the edges of the elements most remote from the center or mid point of the grid or radiant 28. While this form of radiant arch is more difficult and expensive to fabricate than the form illustrated in FIGURE 12, it is also more efficient since the combination of inwardly and outwardly directed flanges provides more intimate contact between the combustion products exiting through passages 168 and the radiant elements. Also, the grid or radiant 28 construction illustrated in FIGURE 15 provides a completely uninterrupted radiant surface since one cannot "see through" passages 168 even from positions along the longitudinal axes of these passages.

The radiant elements 170 illustrated in FIGURE 16 are similar to those described previously but are designed to be oriented normally to the side rails rather than at an angle as in the embodiments of FIGURES 12 and 13. In this embodiment, the arches have a first frustoconical section 172 and a second integral cylindrical portion 174, which overlaps the frustoconical portion of the adjacent element 170 and co-operates with it to form an exhaust passage 176. The overlapping portions 174 of the elements guide combustion products exiting through passages 176 into contact with adjacent elements and minimize the observable area of the openings between the elements.

The foregoing description of suitable radiating elements will suggest other configurations to those skilled in the arts to which this invention pertains. To the extent that such configurations are not expressly excluded from the appended claims, they are fully intended to be covered therein.

As discussed previously, one of the advatnages of the present invention is that all components thereof except the radiants remain at relatively low temperatures. Even so, there may be a considerable longitudinal elongation of the burner components in infrared generators of very long lengths. Accordingly, for industrial ovens and other applications requiring infrared generators of long length, the lines are preferably made up of shorter infrared generators assembled in end-to-end relationship. Another feature of the present invention resides in a novel, improved arrangement for proportioning the combustible mixture among the infrared generators in a multiple unit installation of this type and for propagating the flame from the combustion zone 25 of one infrared generator to the combustion zone of the adjacent generator.

Referring now to FIGURES 17 and 18, infrared generator installation 178 includes two infrared generators 180 and 182, which may be identical to those described above.

In addition to infrared generators 180 and 182, infrared heating installation 178 includes a combustible mixture distributing assembly 186 and a flame propagating flash tube assembly 188.

In a typical line type installation, the fuel for the entire line will be supplied to the exposed end of one end generator. Flow distributing assemblies 186 are provided to conduct this mixture from the infrared generator to which it is supplied to successive infrared generators in the installation. These assemblies are of the type described in copending application No. 401,135, now Patent No. 3,307,529 issued Mar. 3, 1967, and their details do not form part of the present invention. Accordingly, it is not considered necessary to describe them in detail herein.

Briefly speaking, however, each of these assemblies includes a conduit 189 spanning the gap 190 between the distribution tubes 22 of adjacent infrared generators and extending through suitable apertures (not shown) in the closure forming legs 192 of the adjacent end brackets 32 into the distribution tubes of the infrared generators. Accordingly, conduit 189 provides a flow path for the combustible mixture from the distribution tube 22 of one infrared generator to the distribution tube of the other. To regulate the flow through conduit 189 and thereby proportion the combustible mixture between the two infrared geenrators, assembly 186 is provided with a damper or valve 194 which may be adjusted from the exterior of the conduit as shown in FIGURE 17.

In a multiple unit installation of the type described above, the infrared generator line is lighted from one end, and the flame is propagated from one infrared generator to the next. Applicant has found that this can be done effectively and inexpensively by use of the novel flash tube assembly 188 illustrated in FIGURES 17 and 18. As best shown in FIGURE 18, assembly 188 includes a V-sectioned flash tube 196 with exhaust openings 198 formed in its side walls 200 and an imperforate flash tube cover 202. The latter component has a main body portion 204 and two flanges 206 which extend over and partially shield openings 198 to protect the flame in flash tube 196 against the effects of high velocity air currents.

As shown in FIGURE 17, flash tube assembly 188 spans the gap 190 between infrared generators 180 and 182. Its ends extend through the openings 115 in the adjacent ends of the radiants 28 of the two infrared generators into the combustion zones surrounded by the radiants. Accordingly, flame existing in one combustion zone is propagated through flash tubes 196 to the combustion zone 25 of the other infrared generator.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An infrared generator of the combustion type, comprising:
   (a) a line burner including a combustible mixture distribution tube and means for distributing the mixture from the distribution tube to a combustion zone adjacent the exterior of and extending generally the length of said tube; and
   (b) means defining a combustion chamber extending the length of and enclosing said combustion zone so that the combustion of the fuel-air mixture occurs within the combustion chamber;
   (c) the combustion chamber defining means including a radiant adapted to be heated to incandescence by the fuel-air mixture burning within the combustion chamber; and
   (d) said radiant including a series of individually formed, overlapping arches with passages for the escape of combustion products between adjacent arches.

2. The infrared generator of claim 1, wherein said radiant further comprises side rails extending generally the length of the radiant on opposite sides thereof, the ends of said arches being fixed to said side rails to thereby join said arches and said side rails into a unitary structure.

3. The infrared generator of claim 1, wherein the arches are arranged in two groups disposed in mirror image relationship with the outlet ends of the passages formed by the arches in said groups all facing the center of the radiant.

4. The infrared generator of claim 3, together with a central arch disposed between the two groups of overlapping arches, the surfaces of said central arch being generally parallel to the longitudinal axis of the radiant and the ends of said central arch being overlapped by the arches thereadjacent.

5. The infrared generator of claim 1, together with means at least partially closing the opposite ends of said radiant.

6. An infrared generator of the combustion type comprising:
   (a) a line burner including a combustible mixture distribution tube and means for distributing the mixture from the distribution tube to a combustion zone adjacent the exterior of and extending generally the length of said tube; and
   (b) means defining a combusion chamber extending the length of and enclosing said combustion zone so that the combustion of the fuel-air mixture occurs within the combustion chamber;
   (c) the combustion chamber defining means including a radiant adapted to be heated to incandescence by the fuel-air mixture burning within the combustion chamber;
   (d) said radiant being comprised of individually formed members having passages therebetween for the escape of combustion products, the exits of said passages being displaced longitudinally from their entrances and the individually formed members comprising said radiant being overlapped to provide an effectively continuous radiating surface and to guide the combustion gases flowing through said passages into contact with both sides of said members, whereby said combustion gases heat both sides of each of the members comprising said radiant.

7. The infrared generator of claim 6, wherein said individually formed members have a generally frustoconical configuration.

8. The infrared generator of claim 6, wherein said overlapping members have a generally semicylindrical configuration and are inclined at similar, pronounced angles to the longitudinal axis of the radiant, the central portions of said members being further from the longitudinal center line of the radiant than the end portions thereof.

9. The infrared generator of claim 6, wherein said overlapping members are disposed at substantially right angles to the longitudinal axis of the infrared generator and have integral frustoconical and cylindrical portions, the cylindrical portion of each radiant member at least partially overlapping the frustoconical portion of the adjacent member to guide the combustion products flowing through the passages between said members into heat transfer relationship with said adjacent member.

10. The infrared generator of claim 6, wherein the combustion chamber defining means includes at least two independently mounted radiants disposed in end-to-end relationship with a gap therebetween to accommodate longitudinal expansion of said radiants.

11. The infrared generator of claim 10, including a gap shield overlying said radiants and spanning the gap therebetween to provide continuity in the radiating surface, said shield being mounted independently of said radiants.

12. An infrared generator of the combustion type comprising:
(a) a line burner including a combustible mixture distribution tube and means for distributing the mixture from the distribution tube to a combustion zone adjacent the exterior of and extending generally the length of said tube;
(b) means defining a combustion chamber extending the length of and enclosing said combustion zone so that the combustion of the fuel-air mixture occurs within said chamber, the combustion chamber defining means including a radiant adapted to be heated to incandescence by the fuel-air mixture burning within the combustion chamber, said radiant having a portion with a generally archlike cross-sectional configuration facing said combustible mixture distributing means;
(c) reflectors for concentrating and directing in the desired direction and pattern the radiant energy emitted from the incandescent radiant, said reflectors being fixed to and supporting said radiant;
(d) means for shielding said reflectors from heat liberated from the fuel-air mixture burning in said combustion zone comprising members incorporated in said radiant and extending generally the length of said combustion zone, said members extending laterally from said radiant to the combustible mixture distributing means, whereby said members in part define said combustion zone and are interposed between said combustion zone and said reflectors.

13. The infrared generator of claim 12, wherein:
(a) said radiant includes parallel, spaced apart side rails and a series of individually formed, overlapping arches with passages for the escape of combustion products therebetween, said arches being fixed to said side rails; and
(b) said heat shielding members are fixed to said side rails.

14. The infrared generator of claim 13, wherein said heat shielding members are integral with said side rails.

15. An infrared generator of the combustion type comprising:
(a) a line burner including a combustible mixture distribution tube and means for distributing the mixture from the distribution tube to a combustion zone adjacent the exterior of and extending generally the length of said tube;
(b) means defining a combustion chamber extending the length of and enclosing said combustion zone so that the combustion of the fuel-air mixture occurs within the combustion chamber, the combustion chamber defining means including a radiant adapted to be heated to incandescence by the fuel-air mixture burning within the combustion chamber; and
(c) reflectors for concentrating and directing in the desired direction and pattern the radiant energy emitted from the incandescent radiant;
(d) said radiant comprising a series of individually formed radiating members having passages therebetween for the escape of combustion products, means joining said individually formed radiating members into a unitary structure, and means detachably fixing said unitary structure to said reflectors.

16. The infrared generator of claim 15, wherein:
(a) said reflectors have slots therein; and
(b) the means detachably fixing said radiant to said reflectors includes tabs fixed to said radiant, said tabs having portions extending through the slots in said reflectors and shoulders positioning said radiant relative to said reflectors, the tab portions extending through said slots having ears which are displaceable to engage the reflectors on the sides thereof opposite said shoulders and thereby prevent movement of said radiant away from said reflectors.

17. The infrared generator of claim 15, wherein:
(a) the means joining the radiating members into a unitary structure comprises side rails at the sides of said radiant; and
(b) the radiant further includes radiant legs generally coextensive in length with the radiant fixed to said side rails and extending from said individually formed radiating members to said reflectors to shield said reflectors from heat generated in said combustion zone.

18. A radiant heat generating installation, comprising:
(a) at least two infrared generators of the combustion type, said infrared generators being arranged in end-to-end relationship and each said infrared generator including:
(1) a line burner including a combustible mixture distribution tube and means for distributing the mixture from the distribution tube to a combustion zone adjacent the exterior of and extending generally the length of said tube; and
(2) means defining a combustion chamber extending the length of and enclosing said combustion zone so that the combustion of the fuel-air mixture occurs within the combustion chamber, the combustion chamber defining means including a radiant adapted to be heated to incandescence by the fuel-air mixture burning within the combustion chamber;
(b) means for supplying a combustible mixture to one of said line burners and for conducting said mixture from said one to the other of said line burners; and
(c) means for propagating flame from the combustion chamber of said one infrared generator to the combustion chamber of the infrared generator thereadjacent, including a flash tube extending through the adjacent ends of the radiants of said infrared generators into their combustion zones, said flash tube having a perforate body portion and an imperforate cover fixed thereto.

19. The installation of claim 18, wherein the means for conducting flow from one to another of said generators comprises a conduit between and communicating with the interiors of the distribution tubes incorporated in said generators and valve means for regulating the flow through said conduit.

20. A radiant for infrared generators of the combustion type comprising:
(a) a longitudinally extending series of individually formed, transversely oriented arches disposed in overlapping relationship, said arches being configured to provide passages for the escape of combustion products therebetween; and (b) side rails extending generally the length of the radiant on opposite sides thereof, the ends of said arches being fixed to said side rails to thereby join said side rails and said arches into a unitary structure.

21. The radiant of claim 20, wherein:
(a) the central portions of said arches are inclined relative to the longitudinal centerline of the arch;
(b) said arches are in two groups disposed in mirror image relationship with the arches in each group similarly aligned; and
(c) the edges of the inclined portions of said arches most remote from said longitudinal centerline are nearest the midpoint of the radiant between said two groups.

22. The radiant of claim 21, together with a central arch disposed between the two groups of inclined arches and fixed to said side rails, the surfaces of said central arch being generally parallel to the longitudinal axis of the radiant and the ends of said central arch being overlapped by the inclined arches thereadjacent.

23. The radiant of claim 20, wherein:
(a) said side rails have generally parallel radiant mounting legs and arch supporting legs extending at right angles to said mounting legs; and
(b) each of said arches has laterally extending wings at the opposite sides thereof, said wings being fixed to the arch supporting legs of said side rails.

24. The radiant of claim 23, wherein the supporting legs of said side rails have portions thereof adapted to engage opposite sides of the wings of said arches to thereby fix said arches to said side rails.

25. The radiant of claim 20, together with heat shields extending generally the length of said radiant adjacent said side rails, said shields being fixed to said side rails and having inclined legs extending from said side rails towar the center of said radiant.

26. The radiant of claim 25, wherein each heat shield is integral with the associated side rail.

27. The radiant of claim 20, together with means at least partially closing the ends thereof.

28. The radiant of claim 20, together with ties extending between and fixed to said side rails at opposite ends of said radiant to maintain said side rails in parallel, spaced apart relationship.

29. The radiant of claim 20, together with mounting tabs fixed to said side rails, said tabs having ears adapted to be displaced relative to the main portions of said tabs to secure said radiant to a supporting structure.

30. The radiant of claim 25, together with radiant legs fixed to said side rails and extending generally the length of said rails, said radiant legs co-operating with said overlapped arches to provide an elongated radiating structure having a generally U-shaped cross-sectional configuration.

31. The radiant of claim 21, wherein the arches have a generally frustoconical configuration with the larger end of the frustum facing the midpoint of the radiant, said arches being disposed at substantially right angles to the side rails.

32. The radiant of claim 31, together with an inwardly inclined lip on the larger end of each said arch for directing combustion products flowing through the passage between each such arch and the arch thereadjacent into heat transfer relationship with the adjacent arch.

33. The radiant of claim 32, together with an outwardly inclined lip on the smaller end of each said arch in spaced relationship to the inwardly inclined lip on the larger end of the adjacent arch and adapted to co-operate therewith to guide the combustion products flowing through the passage between said arches into heat transfer relationship with said adjacent arch.

34. The radiant of claim 20, wherein said arches have a generally semicylindrical configuration and are inclined at similar, pronounced angles to said side rails, the central portions of said arches being further from the longitudinal center line of the radiant than the end portions thereof.

35. The radiant of claim 20, wherein said arches are disposed substantially at right angles to said side rails and have integral frustoconical and cylindrical portions, the cylindrical portion of each radiant at least partially overlapipng the frustoconical portion of the adjacent radiant to guide the combustion products flowing through the passages between said arches into heat transfer relationship with said adjacent arch.

References Cited

UNITED STATES PATENTS

| | | | |
|---|---|---|---|
| 799,956 | 9/1905 | Willson. | |
| 3,251,356 | 5/1966 | Prince et al. | 126—92 |
| 3,312,269 | 4/1967 | Johnson | 158—99 |

JAMES W. WESTHAVER, *Primary Examiner.*

U.S. Cl. X.R.

431—191, 328